United States Patent [19]
Smith, Jr.

[11] Patent Number: 5,243,891
[45] Date of Patent: Sep. 14, 1993

[54] METHOD AND APPARATUS FOR CUTTING BUILDING MATERIAL

[76] Inventor: Ernest G. Smith, Jr., 401 Auburn, Plymouth, Mich. 48170

[21] Appl. No.: 768,818

[22] Filed: Sep. 30, 1993

[51] Int. Cl.$^5$ .............................. B27B 9/04
[52] U.S. Cl. ........................ 83/487; 83/574; 83/761; 30/374; 30/393
[58] Field of Search ............ 83/483, 745, 761, 487, 83/374, 574; 30/392, 393, 373, 374, 375, 376, 377

[56] References Cited

U.S. PATENT DOCUMENTS

| | | | |
|---|---|---|---|
| 2,676,624 | 4/1954 | Gecmen | 30/373 |
| 4,453,312 | 6/1984 | Nishioka | 83/745 |
| 4,751,865 | 6/1988 | Buckalew | 83/574 |
| 4,777,726 | 10/1988 | Flowers | 30/374 |
| 5,035,061 | 7/1991 | Bradbury et al. | 30/373 |

FOREIGN PATENT DOCUMENTS 0735238  5/1966  Canada ................................ 30/373

*Primary Examiner*—Douglas D. Watts
*Assistant Examiner*—Allan M. Schrock

[57] ABSTRACT

An apparatus for allowing a craftsman to make uniform cuts in building material. The apparatus includes a hand-held electrically operated circular saw as well as a slide for guiding the building material in a first direction. First and second members are used for guiding the circular saw in a second direction. The craftsman is thereby able to repeatedly make uniform cuts in building material by manually sliding the building material on the slide and then moving one of the members in the second direction so as to cause the circular saw to cut the building material.

6 Claims, 2 Drawing Sheets

METHOD AND APPARATUS FOR CUTTING BUILDING MATERIAL

BACKGROUND OF THE INVENTION

1. Field of the Invention

This invention relates to the field of hand-operated construction equipment, and more particularly to a method and apparatus for cutting building material.

2. Description of Related Art

During the construction of wooden structures, it is often necessary to use a relatively large amount of lumber. For example, lumber may be typically used to form both interior and exterior walls of buildings and houses, and may also be used to fabricate forms which are used when pouring concrete foundations. In addition, lumber is used in siding, wooden decks or porches, wooden floors and so forth. Because lumber is typically purchased in predetermined lengths, it is often necessary to repeatedly cut lumber to form wooden structures.

Because lumber is relatively heavy and bulky, it is often difficult to uniformly cut the lumber such that the cut is straight and in a direction which is substantially perpendicular to the length of the lumber. The reason for this difficulty is that a relatively large effort is required to repeatedly position an often long piece of lumber each time a cut is to be made. In addition, it is often difficult to position and secure a piece of lumber with one hand, and accurately position a hand-held electrically operated circular saw with the other hand. These problems are compounded by the fact that circular saws are relatively difficult to control with one hand while lumber is being cut.

While the use of table saws and radial arm saws may overcome some of these problems, they are often of little use to the craftsman who may find it virtually impossible to repeatedly transport these heavy pieces of equipment to different job sites. Even when they are taken to the job site, they must generally be left overnight where they then become vulnerable to thieves. Accordingly, there is a need for a relatively lightweight and compact device which enables the craftsman to make uniform cuts in lumber with relative ease.

SUMMARY OF THE INVENTION

According to the preferred embodiment of the present invention, an apparatus for allowing a craftsman to make uniform cuts in lumber is disclosed. The apparatus comprises a hand-held electrically operated circular saw, as well as first means for guiding the lumber in a first direction. The apparatus further comprises second means for guiding the circular saw in a second direction, the circular saw being secured to the second means for guiding. The apparatus permits the craftsman to repeatedly make uniform cuts in lumber by allowing the craftsman to manually slide the lumber on the first means for guiding and then moving at least a portion of the second means for guiding in the second direction.

BRIEF DESCRIPTION OF THE DRAWINGS

Various advantages of the present invention will become apparent to one skilled in the art upon reading the following specification and by reference to the following drawings in which.

DESCRIPTION OF THE PREFERRED EMBODIMENT

Figure 1:
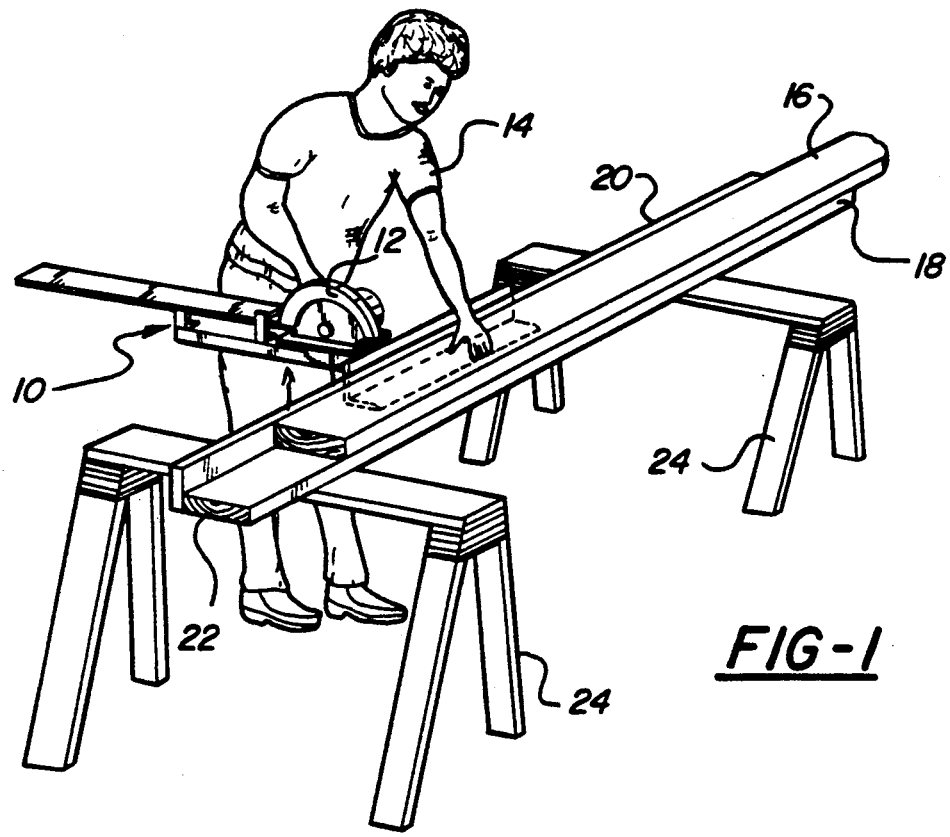
FIG. 1 is an elevational view of the preferred embodiment of the present invention being used by a craftsman.
Figure 3:
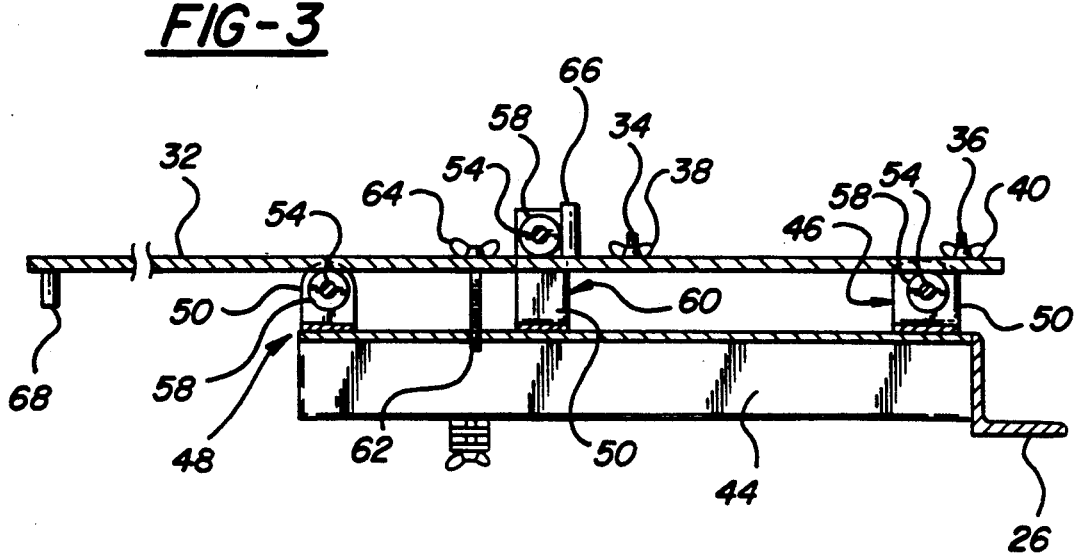
FIG. 3 is a cross-section of the preferred embodiment of the present invention taken along the lines 3—3 in FIG. 2.

Referring now to FIG. 1, the apparatus 10 for cutting lumber is shown. The apparatus 10 is used in conjunction with a hand-held electrically operated circular saw which is defined by the numeral 12. The apparatus 10 permits a craftsman 14 to repeatably cut a piece of lumber 16 (or other building material) as the lumber 16 is slid by the craftsman 14 along an L-shaped slide 18. The slide 18 may be typically made from two pieces of wood 20 and 22 which are secured at right angles and therefore can easily be constructed at the building site. It is to be understood that other types of slides may also be used. In addition, the slide 18 may be supported by a plurality of sawhorses 24, though other suitable means may be used to support the slide.

Figure 2:
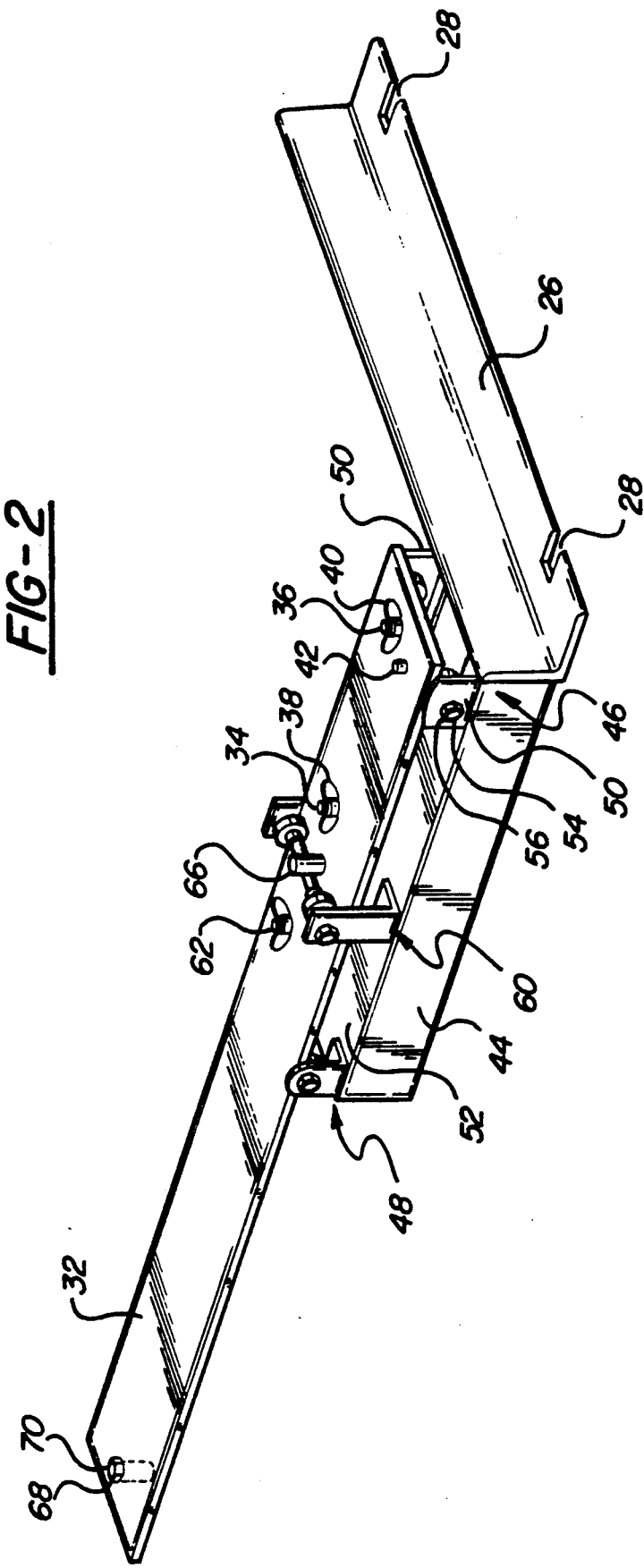
FIG. 2 is an elevational view of the preferred embodiment of the present invention shown in FIG. 2.

The apparatus 10 includes a first member 26 having an L-shaped cross-section as shown in FIG. 2. The first member 26 is used to allow the apparatus 10 to be secured to the undersurface of the slide 18 in a suitable manner. For example, the first member 26 may have a plurality of the grooves 28 which are used to accommodate bolts (not shown) in the slide 18 and therefore being able to secure the first member 26 to the slide 18. While the first member 26 may be made from aluminum, other suitable materials may be used.

To secure the circular saw 12 to the apparatus 10, the apparatus 10 further comprises a second member 32. The second member 32 is generally rectangular in shape and is preferably made from aluminum. The second member 32 includes a first mounting bolt 34 and a second mounting bolt 36. The first and second mounting bolts 34 and 36 are able to accommodate first and second wing nuts 38 and 40 and are able to pass through suitable apertures (not shown) in the circular saw 12 and as well as in the second member 32. By threadably engaging the wing nuts 38 and 40 onto the bolts 34 and 36 respectively after the bolts 34 and 36 have been inserted through the apertures in the circular saw 12 and the second member 32, the circular saw 12 may be removably secured to the second member 32. In addition, the second member 32 has a locating pin 42 which is used for accurately positioning the circular saw 12 on the second member 32 when the circular saw 12 is being used as a rip saw to cut wood into long parallel strips.

To allow the second member 32 to move perpendicularly with respect to the first member 26, the apparatus 10 further includes a third member 44 which is preferably made from aluminum. The third member 44 is fixedly secured to the first member 26 in such a manner as to be perpendicular to the first member 26. For example, the first and third members 26 and 44 may be secured by a hinge and bracket arrangement or may be welded together. The third member 44 has a U-shaped cross-section.

The third member 44 includes first and second bearing members 46 and 48. The first and second bearing members 46 and 48 are disposed on either ends of the third member 44. The first bearing member 46 comprises two L-shaped brackets 50. One leg of each of the L-shaped brackets 50 is secured to the upper surface 52 of the third member 44 by a suitable means such as by a nut and bolt. The second leg of the L-shaped brackets 50 extends upwardly from the third member 44 to a position above the plane established by the second member 32 in such a manner as to limit sideways movement of the second member 32 with respect to the third member 44. In addition, the second legs of the L-shaped brackets 50 each comprise an aperature through which extends an axle 54. The axle 54 is secured to each of the L-shaped brackets 50 by means of an internally threaded nut 56 which threadably engage the external threaded portions of the axle 54. The axle 54 includes four stainless steel washers which are used as spacers to reduce wear on the members 32.

Located on the axle are two annular members 58 which are disposed coaxially with the axial centerline of the axle 54 between the L-shaped brackets 50. Each of the annular members 58 is secured to the axle 54 by means of nuts (not shown) which threadably engage the axle 54. The annular members disposed on the axle 54 are able to rotate on their interior ball bearing surfaces.

The second bearing member 48 is substantially similar to the first bearing member 46, but is longitudinally displaced from the first bearing member 46 as discussed above. The apparatus 10 also includes a third bearing member 60 which is substantially similar to the first and second bearing members 46 and 48. However, the third bearing member 60 is disposed such that the second member 32 is disposed between the third member 44 and the axle 54 associated with the third bearing member 60. Accordingly, the third bearing member 60 prevents upward movement of the second member 32 with respect to the third member 60. The components of the second and third bearing members 48 and 60 are given the same reference numerals as were given to similar components of the first bearing member 46.

As those skilled in the art will appreciate, the second member 32 is able to longitudinally slide with respect to the third member 44 by rotation of the annular members 58 associated with each of the bearing members 46, 48 and 60. Since the second legs of the L-shaped brackets 50 and the stainless steel washers associated with the first bearing member 46, the second bearing member 48, and the third bearing member 60, prevent sideways movement of the second member 32 with respect to the third member 44, the second member 32 is limited to longitudinal movement. The apparatus 10 also has a wing bolt 62 which extends between the second and third member 32 and 44 and which is used to prevent longitudinal movement of the second member 32 with respect to the third member 44 when the apparatus 10 is not in use. It will be understood that the wing bolt 62 is removed from the apparatus 10 when the apparatus 10 is in use.

To prevent excessive longitudinal movement of the second member 32 with respect to the third member 44, the apparatus 10 also comprises first and second stops 66 and 68. The first stop 66 is cylindrical in shape and is disposed perpendicularly upward from the second member 32. When the second member 32 is moved excessively to the left of the third member 44 as shown in FIG. 2, the first stop 66 engages the axle 54 of the third bearing member 60 so as to prevent further movement of the second member 32. The first stop 66 may be secured to the second member 32 by means of an internally threaded nut (not shown) which engages an upper externally threaded portion of the first stop 66. The first stop 66 may have a rubber-like surface so as to reduce the possibility of damage when the first stop 66 encounters the axle 54 at the third bearing member 60.

Similarly, the second stop 68 extends in a perpendicularly downward direction from the second member 32. When the second member 32 is moved excessively to the right, the second stop 68 engages the axle 54 of the second bearing member 48 thereby preventing additional longitudinal movement of the second member 32. The second stop 68 is also secured to the second member 32 by means of an internally threaded nut 70 which engages an externally threaded portion of the second stop 68. In addition, the second stop 68 may have a rubber-like surface so as to reduce the possibility of damage when the second stop 68 encounters the axle 54 at the second bearing member 48. Both the first stop 66 and the second stop 68 are secured to the member by an internally threaded hole and held in place with a locknut.

The method by which the apparatus 10 is used will now be described. The craftsman 14 first secures the first member 26 to the slide 18 which the craftsman 14 has previously built. The slide 18 with the apparatus 10 attached is then preferably disposed on a pair of sawhorses 24. The circular saw 12 is then attached to the second member 26 by means of nuts and bolts 34-40. The craftsman 14 then adjusts the height of the circular saw 12 so as to allow the circular saw 12 to cut the lumber 16 without cutting through the bottom surface of the slide 18.

The craftsman 14 then places the lumber 16 on the slide 18 and moves the lumber 16 into cutting position. The craftsman 14 then slides the second member 32 along the first, second and third bearing members 46, 48 and 60 to a sufficient extent as to cut the lumber 16. The craftsman 14 then retracts the circular saw 12 and the second member 32 and moves the lumber 16 into position for the next cut.

It should be understood that while the present invention is described in connection with one specific embodiment, it will be evident that the present invention is able to make uniform cuts in lumber while being relatively lightweight and compact. In addition, the present invention may be easily transported to job sites and may be used to make repeated cuts in other types of building materials such as aluminum and vinyl siding. Other modifications will become apparent to one skilled in the art upon the study of the specification, drawings and following claims.

What is claimed is:

1. An apparatus for uniformly cutting building material to selected lengths comprising:

an electrically operated hand-held circular saw;

means for guiding said building material in a first direction, said means for guiding said building material comprising a slide formed from two pieces of wood each having a rectangular cross-section and secured to each other so as to form an L-shaped cross-section;

means for guiding said electrically operated hand-held circular saw in a second direction, said second direction being substantially perpendicular to said first direction, said means for guiding said electrically operated hand-held circular saw including:

(a) a first substantially planar member, and (b) a second substantially planar member disposed in a plane substantially parallel to and displaced from said first substantially planar member;

means for fastening said means for guiding said electrically operated hand-held circular saw to an underside of said means for guiding said building material; and means for manually positioning said apparatus at a predetermined height, said means for manually positioning comprising a plurality of sawhorses operable to support said first means for guiding.

2. The apparatus of claim 1, wherein said means for guiding said building material includes a L-shaped member operable to engage said means for guiding said building material.

3. The apparatus of claim 2, wherein said electrically operated hand-held circular saw is fixedly secured to said second substantially planar member.

4. The apparatus of claim 2, wherein said means for guiding said building material comprises bearing means for permitting longitudinal movement of said first substantially planar member with respect to said second substantially planar member.

5. The apparatus of claim 4, wherein said bearing means comprises a plurality of bearing members each of which comprise:

a plurality of L-shaped brackets;

an axle disposed substantially between said L-shaped brackets; and a plurality of annular members disposed on said axle.

6. The apparatus of claim 5, further comprising a plurality of stops operable to limit longitudinal movement of said first substantially planar member with respect to said second substantially planar member.

* * * * *